INVENTORS
JOSEPH J. LATUFF
GEORGE R. FRIEND
BY Merchant, Merchant + Gould
ATTORNEYS INVENTORS
JOSEPH J. LATUFF
GEORGE R. FRIEND
BY Merchant, Merchant & Gould
ATTORNEYS

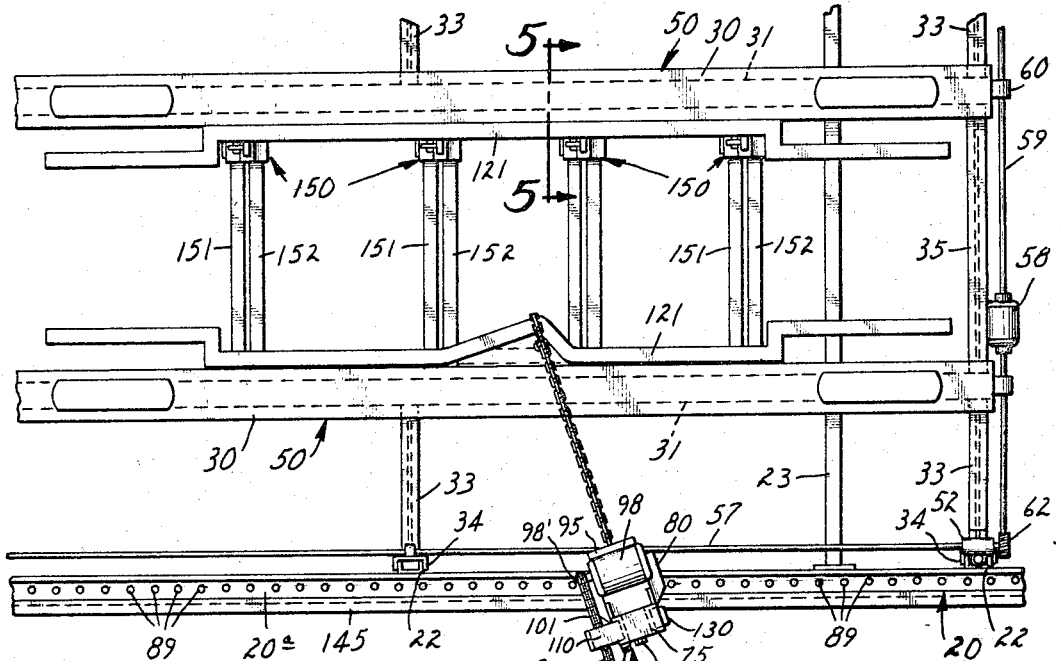
FIG. 4
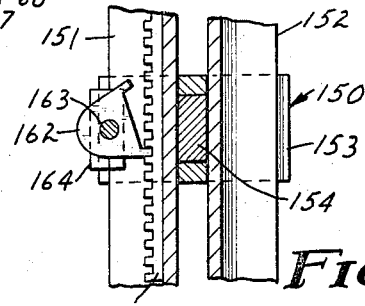
FIG. 7
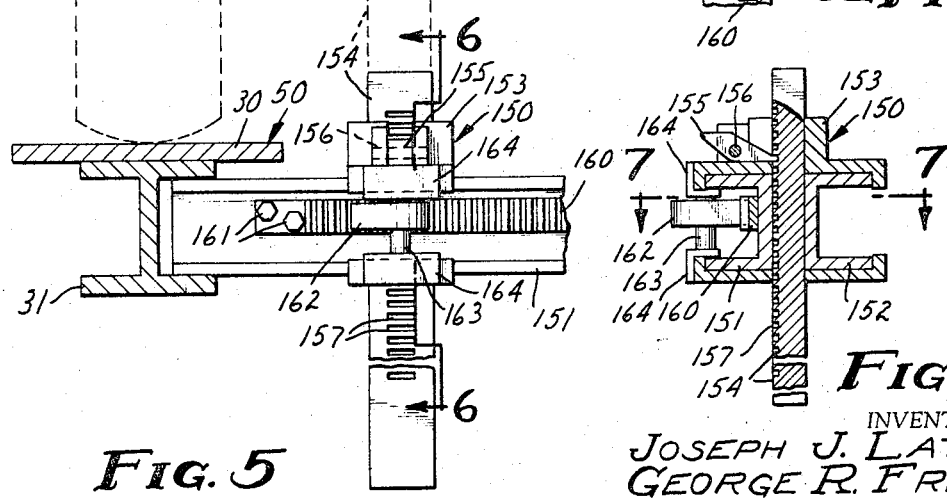
FIG. 5
FIG. 6
INVENTORS
JOSEPH J. LATUFF
GEORGE R. FRIEND
BY Merchant, Merchant & Gould
ATTORNEYS

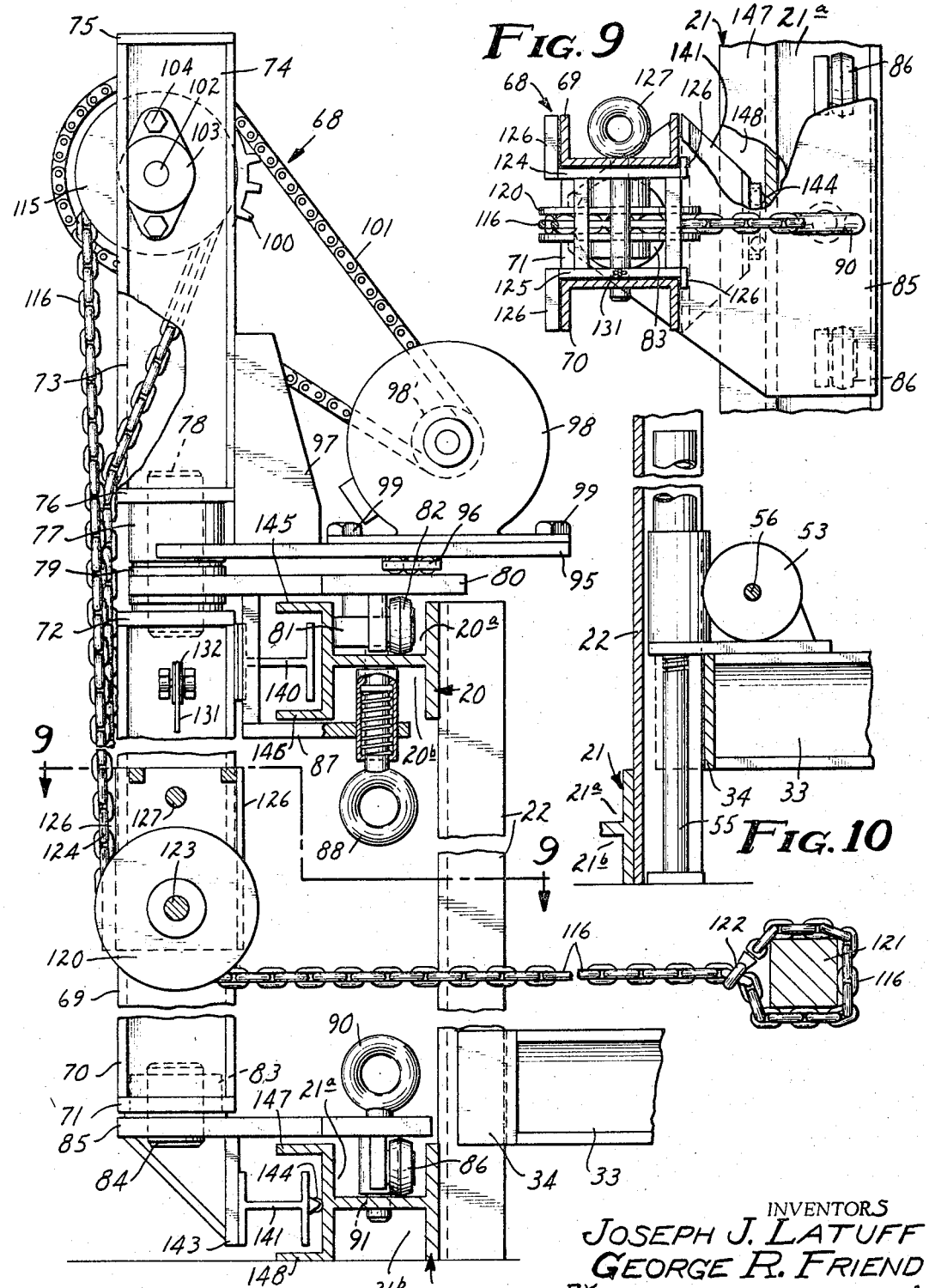

April 16, 1968   J. J. LATUFF ETAL   3,377,834
AUTOMOTIVE VEHICLE FRAME STRAIGHTENING DEVICE
Filed May 3, 1965   6 Sheets-Sheet 6
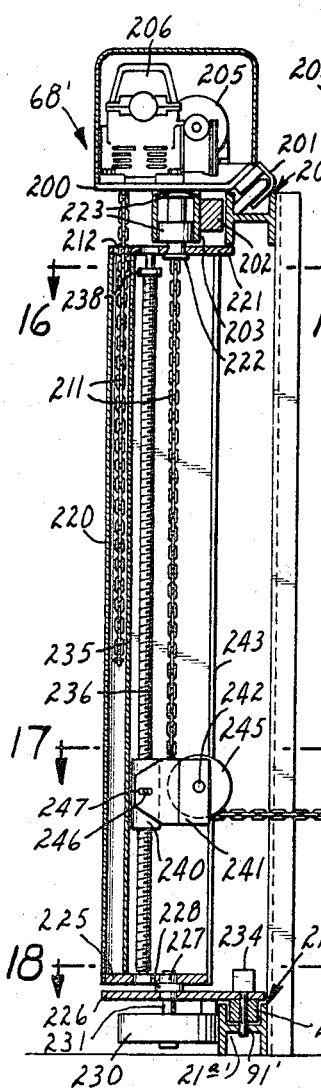
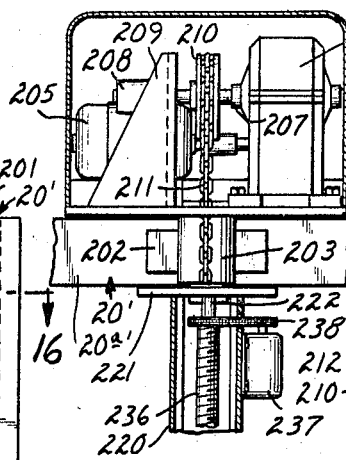
INVENTORS
JOSEPH J. LATUFF
GEORGE R. FRIEND United States Patent Office 3,377,834
Patented Apr. 16, 1968

3,377,834
AUTOMOTIVE VEHICLE FRAME
STRAIGHTENING DEVICE
Joseph J. Latuff and George R. Friend, St. Paul, Minn.,
assignors to Latuff Bros., Inc., St. Paul, Minn., a corporation of Minnesota
Filed May 3, 1965, Ser. No. 452,744
10 Claims. (Cl. 72—293)

ABSTRACT OF THE DISCLOSURE

Apparatus including a pair of substantially similar O-shaped frame members mounted in vertically spaced apart relationship with an elongated subframe mounted in slidable engagement therewith. Apparatus for receiving an automotive vehicle and for engaging the frame and maintaining at least portions thereof immovable, is positioned with the frame members. The subframe has an electric motor mounted thereon and a chain extending across a number of pulleys, at least one of which is movable vertically along the subframe to attach the chain to the automotive vehicle at any desired angle. The subframe is also movable along the frame members so that any portion of the automobile can be acted upon at any desired angle.

This invention pertains to a vehicle frame straightening device and more particularly to a device for applying straightening forces to a vehicle frame from substantially any angle quickly and easily.

In the past vehicle frames were straightened by bulky cumbersome equipment which is only semi-portable and which requires a plurality of men to operate. In general this equipment is set up through much tedious labor to provide a force at a 90° angle to the vehicle frame and the force itself is supplied by some means such as hand operated hydraulic presses or the like. This apparatus for straightening frames is extremely undesirable since it is cumbersome, hard to operate and inefficient.

A copending case entitled "Automotive Vehicle Frame Straightening Device," Ser. No. 332,217, filed Dec. 20, 1963, now Patent No. 3,269,169, and assigned to the same assignee, discloses a frame straightening device utilizing a pair of U-shaped frame members which are mounted horizontally, spaced apart and parallel to form a sort of horizontal track upon which a horizontal subframe is mounted. The subframe has a power source, such as an electric motor, thereon and a vertical structure containing pulleys through which a cable is passed one end being connected to the frame it is desired to straighten and the other end connected to the power source. The vertical structure has a rotatable portion thereon so that the direction of the straightening force may be altered. The vertical structure is also vertically extendible so that the straightening force may be applied at an angle with the horizontal.

By having a power source which is mobile and can be moved quickly to any desired position relative to the frame to be straightened and by having means for changing the angle of the straightening force so that it is applied in exactly the same angle as the force which bent the frame, the vehicle frame may be quickly and efficiently straightened with the best possible effect.

The present invention utilizes a pair of similar, horizontal O-shaped frame members mounted in parallel and vertically displaced one over the other. A vertically elongated subframe is mounted for movement on the two frame members and power means, which in the present embodiment is an electrically energized motor, is fixedly mounted on the subframe. A flexible connecting means, which in the present embodiment is a chain, is operatively connected to the power means and one end is connected to the frame to be straightened. The flexible connecting means also passes over a rotatably mounted pulley which is vertically movable on the subframe and is positioned so that the force is applied to the frame to be straightened in the desired direction. A portion of the subframe is pivotally mounted about a vertical axis and the pulley is movable vertically so that the force may be applied to the frame at any desired angle. In addition the subframe may be conveniently moved along the two frame members to any desired position.

A platform for receiving the vehicle thereon is located centrally in the O of the frame members and may be vertically adjustable if desired. An example of a vertically adjustable platform which may be utilized for the purpose is the grease rack prevalent in most modern automotive service stations and garages. A plurality of adjustable bolsters are quickly and easily attached to the platform and, in operation, are adjusted to engage the vehicle frame in a plurality of positions dynamically opposite the portion of the frame to be straightened. The bolsters are positioned so that only the portion of the frame to be straightened is movable and the remainder of the frame is held immovable. Thus, the applied force affects only the portion of the frame to be straightened.

The present invention improves over the prior art in that it is quickly and easily adapted to be used with any vertically adjustable grease rack or may be used in conjunction with a slightly raised platform which is not vertically adjustable. Also, as will be shown in more detail later, the present invention has fewer moving parts making it simpler to construct and operate and it requires less floor space for installation and operation.

It is a primary object of this invention to provide an improved vehicle frame straightening device.

A further object of this invention is to provide a vehicle frame straightening device which is simpler and more efficient to operate.

A further object of this invention is to provide a vehicle frame straightening device which is simpler and cheaper to construct and easier to maintain.

These and other objects of this invention will become apparent to those skilled in the art upon consideration of the accompanying specification, claims, and drawings.

Referring to the drawings, wherein like characters indicate like parts throughout the figures:

FIG. 4 is a view in top plan, parts thereof broken away, illustrating our novel structure with a bent automotive frame mounted thereon;

FIG. 5 is a greatly enlarged sectional view taken on the line 5—5 of FIG. 4, some parts thereof broken away;

FIG. 6 is a fragmentary sectional view taken along the line 6—6 of FIG. 5;

FIG. 7 is a sectional view taken along the line 7—7 of FIG. 6;

FIG. 8 is a greatly enlarged sectional view taken along the line 8—8 of FIG. 1, some parts thereof broken away and shown in cross section;

FIG. 9 is a fragmentary sectional view taken along the line 9—9 of FIG. 8;

FIG. 10 is a greatly enlarged sectional view taken along the line 10—10 of FIG. 1, some parts thereof broken away;

FIG. 13 is an enlarged sectional view similar to FIG. 8 of another embodiment of our novel structure;

FIG. 14 is an enlarged view in rear elevation of the upper portion of the embodiment illustrated in FIG. 13, some parts thereof broken away and shown in section;

FIG. 15 is an enlarged view in top plan of the embodiment illustrated in FIG. 13, some parts thereof removed;

FIG. 16 is an enlarged sectional view as seen from the line 16—16 in FIG. 13;

FIG. 17 is an enlarged sectional view as seen from the line 17—17 in FIG. 13;

FIG. 18 is an enlarged sectional view as seen from the line 18—18 in FIG. 13, parts thereof broken away; and FIG. 19 is an enlarged side elevation of the lower portion of the embodiment illustrated in FIG. 13.

Figure 1:
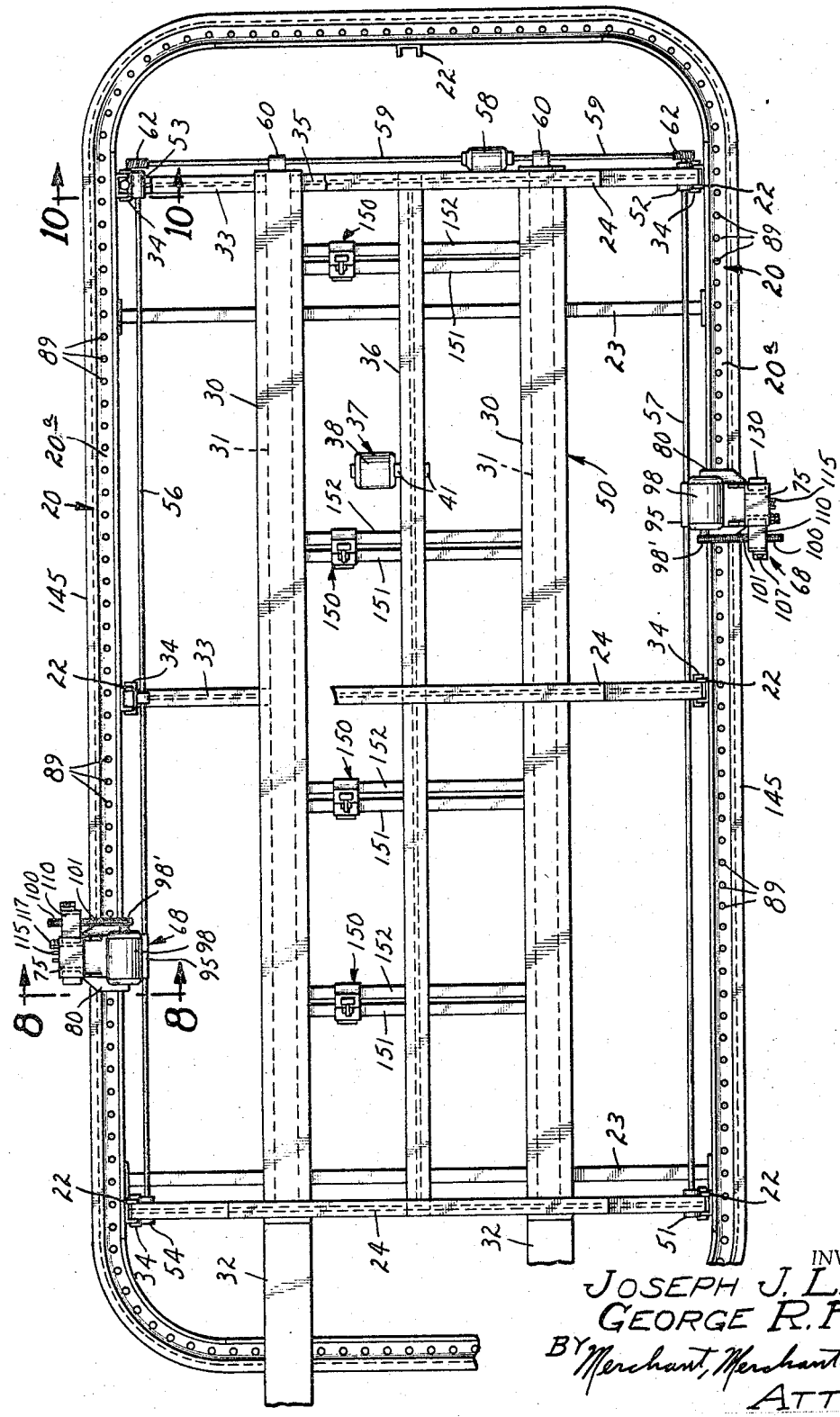
FIG. 1 is a view in top plan of our novel structure, portions thereof broken away.
Figure 2:
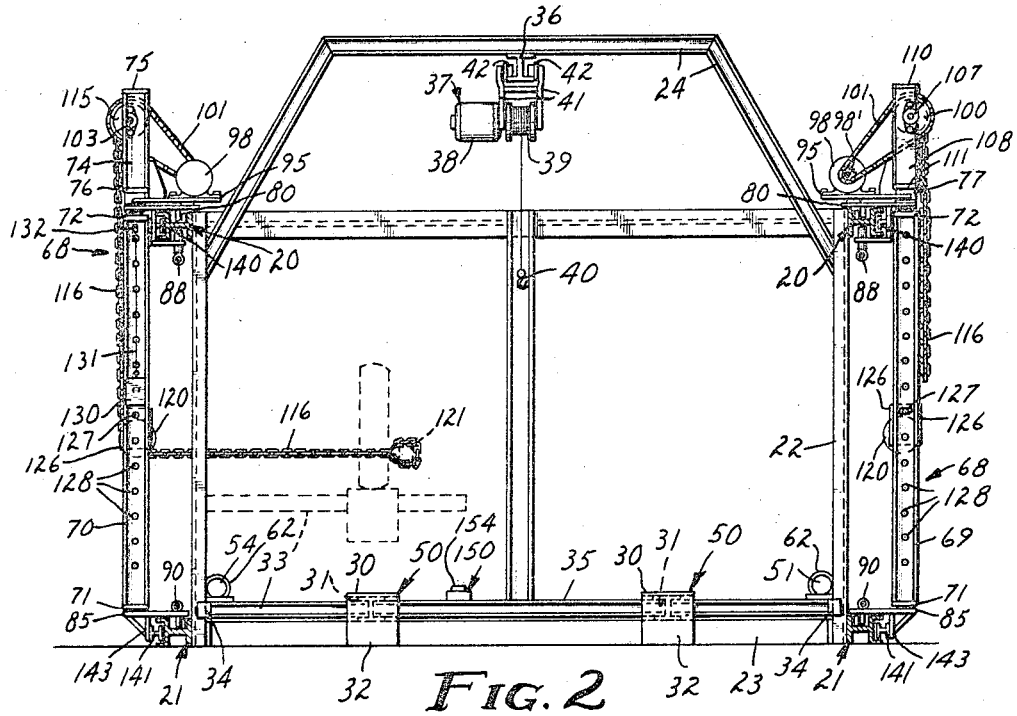
FIG. 2 is a view in front elevation of our novel structure, some parts thereof broken away and shown in section.
Figure 3:
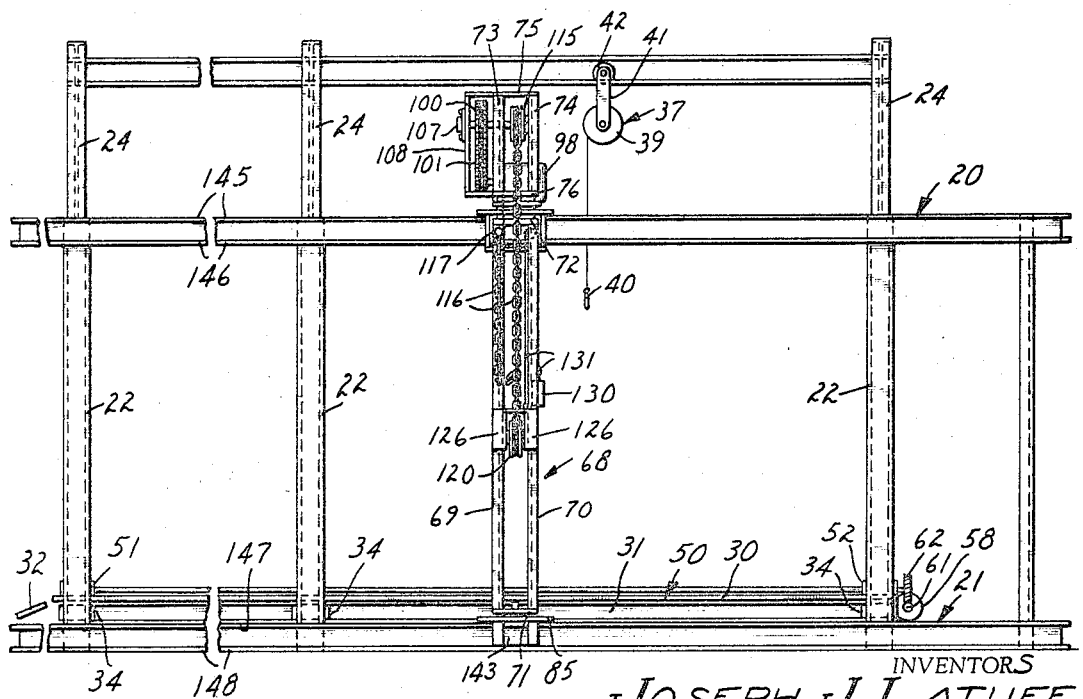
FIG. 3 is a view in side elevation of our novel structure, some parts broken away.
Figure 11:
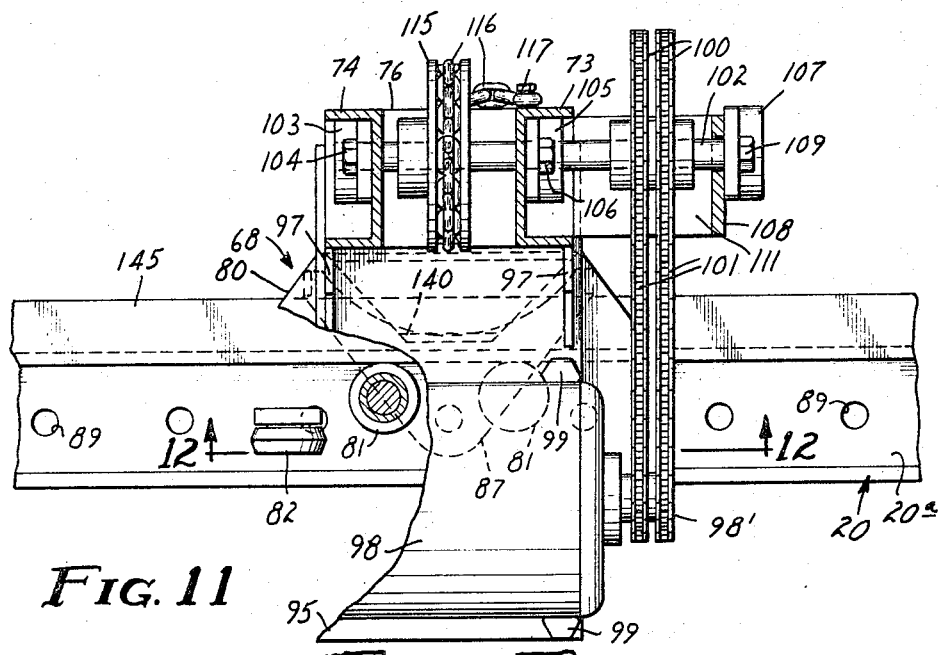
FIG. 11 is a greatly enlarged view in top plan of a portion of our novel structure, some parts thereof broken away and shown in cross section.
Figure 12:
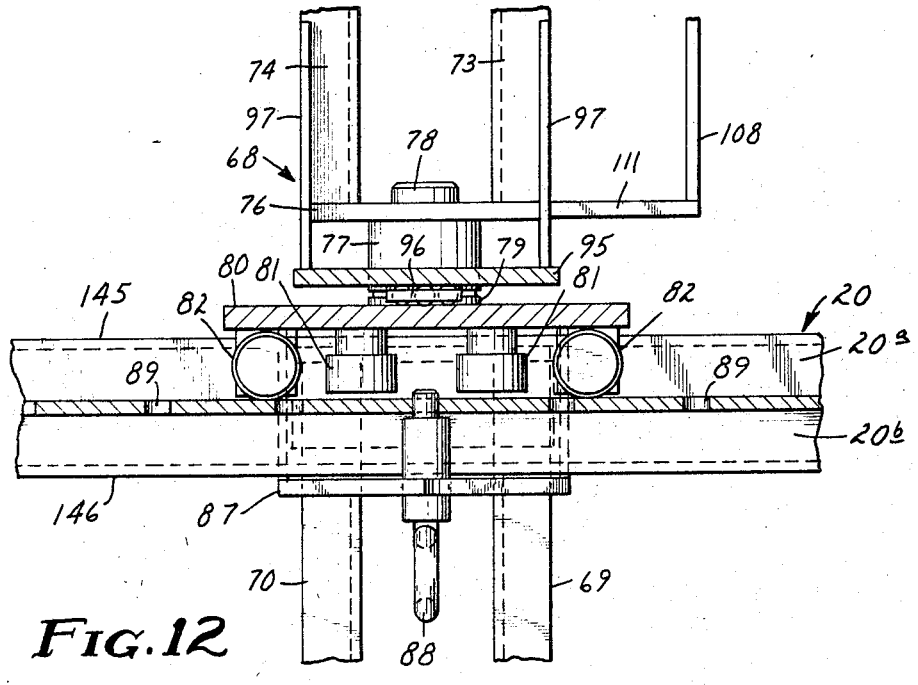
FIG. 12 is a fragmentary sectional view taken along the line 12—12 of FIG. 11.

Referring to FIGS. 1, 2 and 3 the numeral 20 designates an upper O-shaped frame member and the numeral 21 designates a lower O-shaped frame member. The lower O-shaped member 21 is fixedly mounted on a support member or the floor. The upper O-shaped member 20 is displaced vertically from the O-shaped member 21 and lies in a parallel, generally horizontal position directly above the member 21. A plurality of stanchions 22 maintain the upper O-shaped member 20 in the vertically displaced position. While the present embodiment illustrates three stanchions 22 on either side it should be understood that more or less might be utilized. A plurality of horizontal support bars 23 are fixedly attached to either side of the lower O-shaped member 21 and aid in maintaining said sides rigid and fixedly spaced. The sides of the upper O-shaped member 20 are maintained rigid and fixedly spaced by a plurality of inverted U-shaped members 24. The O-shaped members 20 and 21 are formed from I beams so disposed as to define upwardly opening guide channels 20a and 21a and downwardly opening guide channels 20b and 21b. The vertical stanchions 22 are formed from channel irons with the channel disposed inwardly toward the center of the O and the channel irons are affixed to the inner periphery of the O-shaped members 20 and 21.

A platform, generally designated 50, for receiving an automotive vehicle thereon is comprised of a pair of elongated tread rails 30 each fixedly mounted on a supporting I beam 31 of approximately the same length. The supporting I beams 31 with the tread rails 30 thereon are disposed within the O-shaped member 21, parallel to the sides thereof and spaced apart laterally approximately the distance between the wheels on an automotive vehicle. Since the distance between the wheels on automotive vehicles is somewhat standard the two tread rails 30 and the supporting I beams 31 can be placed an average distance apart and, thereby, will be able to receive most of the automotive vehicles in operation at the present time. A short flat plate 32 at the front end of each of the tread rails 30 serves as a ramp so that the automotive vehicle may be rolled or driven onto the tread rails 30.

In this embodiment the tread rails 30 and their supporting I beams 31 are mounted for vertical movement and have associated therewith apparatus for vertically raising and lowering the platform 50 with an automotive vehicle thereon. A plurality of horizontally disposed centering I beams 33 are affixed in a perpendicular relationship to the supporting I beams 31 by some means such as welding and are further positioned so that each centering I beam 33 is perpendicular to and in a plane with one of the stanchions 22. The centering I beams 33 extend from the supporting I beams 31 substantially to the stanchions 22. Affixed to the free end of each of the centering I beams 33 is a short vertical piece of channel iron 34. The channel iron 34 has a channel therein which is slightly wider than the outer dimensions of the stanchions 22. The short pieces of vertical channel iron 34 are affixed to the end of the centering I beams 33 so as to be in sliding engagement with the stanchions 22 and to substantially prevent horizontal movement of the supporting I beams 31. A pair of horizontally disposed I beams 35 extend between the vehicle supporting I beams 31 in line with the foremost and rearmost centering I beams 33 to maintain the supporting I beams 31 properly spaced.

An I beam 36 is fixedly attached to the lower surface of the bight of the U-shaped overhead support members 24 so that the web is vertical. A winch 37 is comprised of a motor 38 and a rotatably mounted drum 39 having a cable and hook 40 depending therefrom. The winch 37 is movably attached to the lower flange of the I beam 36 by means of a pair of vertical supports 41 having rollers 42 mounted thereon for engagement with the upper surface of the lower flange of I beam 36. The I beam 36 is parallel to the vehicle tread rails 30 and approximately centrally located therebetween. Thus, the winch 37 may be moved the length of the vehicle tread rails 30 and is utilized to move automotive vehicles, which are damaged too badly to move properly, onto the platform 50.

The vehicle receiving platform 50, comprising the tread rails 30 mounted on the supporting I beams 31 and the centering I beams 33 (if vertically adjustable), may be mounted permanently at any preferred height or it may be vertically adjustable. In the present embodiment apparatus is disclosed for vertically adjusting the platform 50 but it should be understood that this example is only for explanation of the invention.

Four worm gear screw jacks 51–54 are fixedly attached to the centering I beams 33 at the front right-hand corner of the platform 50 (looking from the left side of FIG. 1), the back right-hand corner, the back left-hand corner, and the front left-hand corner respectively. The manner in which the worm gear screw jacks are connected to the centering beams 33 can be seen more clearly in FIG. 10. In FIG. 10 the end of the centering beam 33 with the channel iron 34 affixed thereto is illustrated in engagement with the stanchion 22. Fixedly attached to the upper flange of the centering I beam 33, by some means such as welding, is the body of the screw jack 53. The screw jack 53 is inverted so that the end of the screw 55 bears against the base of the apparatus, or the floor, and the body portion of the screw jack 53 moves vertically with the platform 50. The screw jack 53 is further mounted so that the screw 55 is positioned within the channel of the stanchion 22 and is thereby removed from the working area of the present device.

Screw jack 53 has a horizontal shaft 56 which, when rotated, causes an internal gear arrangement to operate on the screw 55 and move the main body of the screw jack 53 together with the centering beam 33 vertically. Referring to FIG. 1 the rotatable shaft 56, which motivates screw jack 53, is horizontally elongated and also motivates screw jack 54. A similar shaft 57 motivates both screw jacks 51 and 52 on the right-hand side of the platform 50. A reversible electric motor 58 having a horizontal shaft 59 extending from either end thereof is fixedly mounted to the back end of the platform 50 so that the shaft 59 is parallel with the centering beams 33. The shaft 59 is supported at the end of each of the supporting I beams 31 by a bearing 60 and extends to the ends of the centering beams 33 where a worm gear 61 at each end thereof engages with a gear 62 at the ends of shafts 56 and 57. Thus, when motor 58 is energized the four screw jacks 51–54 are motivated by means of simultaneously rotating shafts 59, 56 and 57. The vertical height of the vehicle receiving platform 50 can therefore be changed by simply energizing the reversible electric motor 58 in the desired direction.

A vertically elongated subframe generally designated 68 is mounted for engagement with the O-shaped members 20 and 21 and moves horizontally thereon in a longitudinal direction in a manner to be described. Subframe 68 can be seen more clearly by referring to FIG. 8. The main frame of the subframe 68 is comprised of a first pair of channel irons 69 and 70 mounted vertically and in a spaced-apart parallel relationship so that the channels therein each face outwardly. The channel irons 69 and 70 are maintained in position by fixedly attaching them to a lower horizontal plate 71 and an upper horizontal plate 72, by some means such as welding.

A second pair of channel irons 73 and 74 are attached together in a manner similar to the channel irons 69 and 70 by an upper horizontal plate 75 and a lower horizontal plate 76. A collar 77 having a vertical pin 78 fixedly attached therein is attached to the underside of the horizontal plate 76 by some means such as welding. The other end of the pin 78 passes through and is fixedly attached to the horizontal plate 72 so as to vertically space the collar 77 from the horizontal plate 72 a sufficient distance to incorporate a bearing 79 therebetween. The bearing 79 has a horizontal plate 80 attached thereto for rotary movement relative to the pin 78.

The subframe 68 is mounted for movement along the outer surfaces of the O-shaped members 20 and 21 by the following apparatus. A first pair of rollers 81 is mounted on the underside of the plate 80 for rotation about a vertical axis and engages the inner surface of the outer flange of the I beam which comprises the O-shaped member 20. A second pair of rollers 82 is mounted on the underside of the plate 80 for rotation about a horizontal axis which is vertical to the O-shaped member 20 so that the roller engages the upper surface of the web of the I beam which comprises the O-shaped member 20. Thus, both pairs of rollers 81 and 82 are positioned in the channel 20a of the O-shaped member 20. A bearing 83 which is fixedly attached to the horizontal plate 71 positioned at the bottom of the subassembly 68 has rotatably engaged therein one end of a vertical pin 84. The other end of the vertical pin 84 is fixedly attached to a horizontal plate 85 so that the plate 85 is rotatable relative to the horizontal plate 71. A pair of rollers 86 are mounted on the underside of the horizontal plate 85 for rotation about a horizontal axis perpendicular to the O-shaped member 21. Roller 86 engages the web of the I beam which comprises the O-shaped member 21 in the channel 21a. Thus, the subassembly 68 is mounted for longitudinal movement along the O-shaped members 20 and 21 by the rollers 81, 82 and 86.

An L-shaped member 87 has one end thereof fixedly attached to the underside of the horizontal plate 80 so that one arm of the L is vertical and the other arm is horizontal. The L-shaped member 87 is further mounted so that a portion of the horizontal arm extends over the channel 20b in the underside of the O-shaped member 20. A pin 88 is vertically mounted in a hole in the portion of the plate 87 extending over the channel 20b. The pin 88 is spring loaded to maintain the upper end thereof in normal engagement with one of a plurality of equally spaced holes 89 in the web of the O-shaped member 20, seen in FIG. 1. The lower end of the pin 88 has a handle thereon for manually disengaging the pin from a hole 89. A second pin 90 is mounted in a hole in a portion of the plate 85 which extends over the channel 21a in the O-shaped member 20. Pin 90 is gravity biased for normally engaging one of a plurality of equally spaced holes 91 in the web of the O-shaped member 21. The upper end of the pin 90 has a handle thereon for manually disengaging the lower end from a hole 91 in the web of the O-shaped member 21. Thus, the subassembly 68 may be moved longitudinally along the O-shaped members 20 and 21 by simply lifting the pin 90 and pulling the pin 88 downward. Once the subassembly 68 is at the desired position releasing the pins 88 and 90 will lock the subassembly in that position.

A horizontal plate 95 is fixedly attached to the collar 77 by some means such as welding and rotates therewith relative to the horizontal plate 80. A bearing assembly 96 is attached to the underside of the horizontal plate 95 and engages the upper surface of the horizontal plate 80 for smooth rotary movement therebetween. A pair of gussets 97 are fixedly attached to the upper surface of the plate 95 and the surfaces of the channel irons 73 and 74 which join therewith and are vertical thereto. A power means, which in this embodiment is an electric motor 98, is fixedly attached to the upper surface of the horizontal plate 95 by means of bolts 99. The motor 98 having a pair of sprockets 98' fixedly attached to the shaft thereof is operatively connected to a pair of sprockets 100 by means of a pair of link chains 101. It should be understood that the electric motor 98, the link chains 101 and the sprockets 100 are utilized in this embodiment for explanational purposes and many other embodiments, for example a direct drive motor, might be utilized and still be within the scope of this invention.

The pair of sprockets 100 are fixedly attached to a shaft 102 for concentric rotation therewith. Shaft 102 is rotatably mounted at one end by means of a bearing 103 which is fixedly attached in the channel of the channel iron 74 by means of bolts 104. A bearing 105 is centrally located on the shaft 102 and fixedly attached in the channel of the channel iron 73 by bolts 106. A third bearing 107 located at the other end of the shaft 102 is fixedly attached to a vertical plate 108 by bolts 109. The vertical plate 108 is in turn attached to the channel iron 73 by upper and lower horizontal plates 110 and 111, respectively, which may be extensions of the horizontal plates 75 and 76 or may simply be attached to the channel iron 73 by some means such as welding. The pair of sprockets 100 are attached to the shaft 102 so as to be positioned midway between the vertical plate 108 and channel 73. Thus, the motor 98 drives the shaft 102 at a speed dependent upon the ratio between the shaft of the motor and the sprockets 100.

Fixedly attached to the shaft 102 at a position midway between the channel 74 and the channel 73 is a pulley 115. Pulley 115 has a chain 116 partially encircling it and contains a plurality of lugs in the periphery thereof for engaging each of the links in the chain thereby providing a force on the chain as the pulley 115 is rotated. The end of the chain 116 which depends from the side of the pulley 115 toward the motor 98 is fixedly attached to the side of the channel iron 73 by a bolt 117. Excess length of chain 116 which is not being utilized on any particular job simply depends from the pulley 115 and the bolt 117, as shown in FIG. 8. The other end of the chain 116 partially encircles a pulley 120 and is fixedly attached to the vehicle frame 121, which is to be straightened, by looping the chain about the frame and connecting the free end of the chain to a link in the chain, utilizing a swiveled hook 122.

The pulley 120 has lugs in the periphery thereof for engaging the links of the chain 116, as shown in FIG. 9. Pulley 120 is mounted for rotary movement about a shaft 123 which is in turn mounted between a pair of spaced apart vertical plates 124 and 125. Plates 124 and 125 are spaced apart a sufficient distance so as to fit between the pair of channel irons 69 and 70 and to easily slide vertically therebetween. The pulley 120 is mounted approximately centrally between the horizontal plates 124 and 125. A plurality of vertical plates 126 are fixedly attached to the protruding edges of the plates 124 and 125 by some means such as welding so as to produce two solid pieces of metal having shapes substantially similar to a channel iron and which are parallel to the channel irons 69 and 70. The channels produced by the vertical plates 124, 125 and 126 have an inner dimension slightly larger than the outer dimensions of the channel irons 69 and 70 whereby the pulley 120 may be freely moved vertically between the channels 69 and 70 but cannot be removed from therebetween.

A pin 127 having a handle at one end thereof is inserted through any of a series of holes 128 passing horizontally through the web of the channels 69 and 70 and through matching holes in the vertical plates 124 and 125 to maintain the pulley 120 at any desired vertical height. A counterweight 130 is attached to the assembly rotatably mounting the pulley 120 by means of a cable 131, which passes over a pulley 132 rotatably mounted near the upper end of the channel iron 70. Thus, by simply removing the pin 127 the pulley 120 is easily moved to any desired vertical position along the channel irons 69 and 70 and is locked in that position by placing the pin 127 through the holes 128 located at that position.

When the chain 116 is connected to the vehicle frame 121, as shown in FIG. 8, and the motor 98 is energized the force applied to the chain 116 will tend to pull the entire subframe 68 toward the O-shaped members 20 and 21. This movement of the subframe 68 is substantially prevented by a pair of short sections of I beams 140 and 141. I beam 140 is fixedly attached to the channel irons 69 and 70, by some means such as welding, so that the web is substantially perpendicular to the longitudinal axis thereof. The outside flange of the I beam 140 is parallel to the outer flange of the I beam comprising the O-shaped member 20 and in juxtaposition thereto. The O-shaped members 20 and 21 have flat pieces of metal 145–148 fixedly attached to the upper and lower edges of the outer flanges in a horizontal position to form a channel in which the sections of I beams 140 and 141 travel when the subframe 68 is moved longitudinally along the O-shaped members 20 and 21.

Thus, when the chain 116 is connected to the vehicle frame 121 and motor 98 is energized the subframe 68 moves a sufficient distance for the outer flange of the section of I beam 140 to butt against the outer flange of the O-shaped member 20 between the horizontal pieces of metal 145 and 146. In a like manner the section of I beam 141 is fixedly attached to a vertical plate 143 which is in turn fixedly attached to the underside of the horizontal plate 85. A small wheel or roller 144 is rotatably attached to the outer flange of the I beam section 141 and engages the outer flange of the O-shaped member 21 between the horizontal pieces of metal 147 and 148 thereby maintaining the lower end of the subframe in the correct position with respect to the O-shaped member 21.

In FIG. 4 a plurality of bolsters 150 are illustrated in juxtaposition to the upper portion of the frame 121. Each bolster 150 is slidably mounted on a pair of horizontal, spaced apart channel irons 151 and 152 the ends of which are fixedly attached to the supporting I beams 31 of the platform 50. The bolster 150 can be seen more clearly by referring to FIGS. 5, 6 and 7. The main body of the bolster 150 is a casting 153 which has a cross section that is somewhat similar to the cross section of an I beam. The casting 153 is mounted so that the web is positioned between the channel irons 151 and 152 and the upper flange is parallel to and in juxtaposition with the upper surfaces of the channel irons 151 and 152 while the lower flange is parallel to and in juxtaposition with the lower surfaces of the channel irons 151 and 152. The ends of the flanges of the casting 153 are extended slightly past the outer edges of the channel irons 151 and 152 and formed inwardly to provide lips so that the channel irons 151 and 152 are nearly enclosed. Thus, the casting 153 slides smoothly longitudinally along the channel irons 151 and 152 but is substantially stationary in all other directions.

The casting 153 has a rectangular shaped hole which passes through the casting parallel to the web and centrally located therein. A vertical bar 154 having a rectangular shaped cross section slightly smaller than the rectangular dimensions of the hole in the casting 153 is slidably mounted in said hole. A vertically extended portion of the casting 153 above the upper flange encircles the vertical bar 154 and adds extra support to the bar for any forces applied to the bar in a horizontal direction. The vertically extended portion of the casting 153 has a notch with a locking pawl 155 rotatably mounted therein by means of a shaft 156. The locking pawl 155 has a tooth therein which cooperates with a rack 157, or a plurality of notches, cut into the side of the vertical bar 154 to provide means for locking the vertical bar 154 at any desired vertical position within the casting 153.

A rack 160 is mounted horizontally in the channel of the channel iron 151 by means of bolts 161. A locking pawl 162 having teeth thereon is pivotally mounted for cooperation with rack 161 by means of a shaft 163. Shaft 163 has a piece of angle iron 164 attached at either end thereof and angle irons 164 are in turn fixedly attached to the inwardly formed lips of the casting 153. The locking pawl 162 cooperates with the rack 160 to lock the bolster 150 in any desired position, longitudinally, along the channel irons 151 and 152.

Thus, as shown in FIG. 5, the vertical bar 154 may be moved upward vertically until the upper end thereof is approximately in the same horizontal plane as the vehicle frame 121 and the vertical locking pawl 155 is then moved into place. The entire bolster 150 is then moved longitudinally along the channel irons 151 and 152 until the vertical bar 154 butts against the frame 121 and then the horizontal locking pawl 162 is moved into place to lock the bolster 150 in the desired position.

In the operation of the present device, referring to FIG. 4, the vehicle frame 121, which it is desired to straighten, is moved into position on the platform 50. A plurality of bolsters 150 are moved into abutment with the upper or left side of the frame 121 and locked into position. A subframe 68 is moved longitudinally along the O-shaped members 20 and 21 until it is in the desired position at which time the pins 88 and 90 are released locking the subframe 68 in that position. The chain 116 is extended and securely fastened to the frame 121 at the point which it is desired to straighten. It should be noted that the subframe 68 can be moved longitudinally and rotated about the pins 78 and 84 to provide any angle between the chain 116 and the vehicle frame 121. In addition, the pulley 120 can be moved vertically on the subframe 68 to provide any angle between the chain 116 and the horizontal plane containing the frame 121.

Thus, the force which the chain 116 applies to the frame 121 can be applied in any desired direction. This is especially advantageous since it is generally best to straighten the frame at the same angle which the force that bent the frame was applied. The bolsters 150 maintain the upper or left side of the frame 121 immovable while the lower or right side of the frame is being straightened.

The FIGS. 13–19 illustrate another embodiment of the vertically elongated frame 68, which in these figures is indicated 68'. A rectangular shaped horizontally positioned platform 200 is mounted for horizontal movement along the upper O-shaped member 20' by a pair of rollers 201, rotatably attached to the platform 200 at a 45° angle for engagement with the O-shaped member 20' in the outside corner of the upwardly opening guide channel 20a', and a semi-cylindrical shoe 202 fixedly attached at the underside of the platform 200 on a downwardly projecting hollow cylinder 203. The shoe 202 is mounted substantially parallel to the outer flange of the O-shaped member 20' but spaced slightly therefrom so that these two members do not normally touch except during the actual pulling operation. The O-shaped members 20' and 21' are similar to the O-shaped members 20 and 21 except that they do not have the additional horizontal pieces of metal 145–148 attached thereto.

A motor 205 fixedly mounted on the upper surface of the platform 200 is operatively connected to a double worm reducer unit 206, which is also mounted on the upper surface of the platform 200. A shaft 207 extending from the worm reducer unit 206 has its free end mounted in a bearing 208, which is fixedly spaced from the platform 200 by a mounting bracket 209. A pulley 210 is attached at approximately the mid-section of the shaft 207 for rotation therewith. The outer periphery of the pulley 210 has lugs formed therein for engagement with the links of a chain 211 which partially encircles the pulley 210. The cylinder 203, which is located vertically below the innermost edge of the pulley 210, is attached to the platform 200 by passing it through a hole in the platform 200 and welding or riveting the cylinder 203 fixedly therein. One end of the chain 211 extends down through the center of the cylinder 203 from the pulley 210. The other end of the chain extends downwardly through an opening 212 in the platform 200, which is located directly under the outermost edge of the pulley 210.

An elongated member 220 having a U-shaped cross section is substantially vertically mounted by mechanism to be explained for rotation about its longitudinal axis below the cylinder 203 and coaxial therewith. The upper end of the member 220 is closed by a substantially horizontal plate 221 fixedly attached thereto. The plate 221 is in turn fixedly attached to one end of a hollow cylindrical shaft 222, coaxial therewith, which extends upwardly through the cylinder 203 and is rotatably maintained therein by a bearing 223 at either end thereof. The chain 211 extending from the inner edge of the pulley 210 passes downwardly through the hollow shaft 222.

The lower end of the member 220 is closed by a horizontal plate 225 which is fixedly attached thereto. A second horizontal plate 226 is fixedly attached to the horizontal plate 225 for rotation therebetween by a bearing 227. The horizontal plate 226 is spaced vertically below the horizontal plate 225 by a spacer 228 which may be a portion of the bearing 227. The plate 226 has a block 229 fixedly attached adjacent the inner edge thereof, which slides along the upwardly opening guide channel 21a' of the O-shaped member 21'. The block 229 is normally spaced from the member 21' on three sides and does not touch the member 21' unless the forces on the subframe 68' become exceptionally high.

A roller 230 rotatably mounted in a horizontal position by a shaft 231 passing through the bearing 227 coaxial with the bearing and the member 220, maintains the subframe 68' correctly spaced from the O-shaped member 21'. A pair of stops 232 fixedly attached to the plate 226 adjacent either edge thereof and spaced from the outer flange of the O-shaped member 21' prevent excessive rotation of the plate 226. A small roller 233 mounted near each of the stops 232 has a compression spring cooperating therewith to apply torsional forces in either direction to the plate 226 to substantially prevent rotation thereof.

A solenoid 239 is mounted on the inner edge of the platform 200 so that the plunger is normally engaged in a hole 89' in the web of the upper O-shaped member 20'. A solenoid 234 is mounted adjacent the inner edge of the plate 226 so that its plunger normally extends downwardly through a hole 91' in the web of the lower O-shaped member 21'. The solenoids 234 and 239 normally maintain the subassembly 68' in any desired position relative to the O-shaped members 21' and 20'. The subassembly 68' is moved horizontally along the O-shaped members 20' and 21' by energizing the solenoids 239 and 234 which withdraws the plungers from the holes 89' and 91', respectively.

A partition 235 extends the length of the member 230 and isolates the rounding bight of the member 220 from the parallel sides thereof. The length of chain 211 extending through the opening 212 in the platform 200 hangs in this isolated storage area where it will not be a hazard. The chain 211 has this additional length for use in the event of long pulls or the like as previously explained.

A shaft 236 extends the length of the member 220 and has either end rotatably mounted in the end plates 221 and 225. The shaft 236 has screw threads cut substantially the entire length thereof. A motor 237 which is mounted on the outer surface of the member 220 at the upper end thereof is operatively connected to the shaft 236 by a chain drive mechanism 238. The motor 237 is a reversible electric motor which rotates the shaft 236, through the chain drive mechanism 238, in either desired direction.

An internally threaded traveling member 240 is operatively mounted on the shaft 236 for vertical movement with rotation of the shaft 236. A pair of substantially parallel vertically mounted plates 241 have a horizontal shaft 242 rotatably mounted therebetween at one end and are attached to the traveling member 240 at the other end by pins 246, which are fixedly mounted horizontally in either side of the traveling member 240 and fit into a pair of horizontal slots 247 in the plates 241 to mount the plates for limited horizontal movement. The member 220, which has a U-shaped cross section, has the entire side facing inwardly toward the O-shaped members 20' and 21', open except for flanges formed by the parallel sides being turned slightly inwardly towards each other. Thus, looking at a cross sectional view of the member 220 it appears substantially as a U with the ends of the arms turned slightly inwardly to partially close the open end thereof. The inner ends of the plates 241 are slidably engaged with the sides and the flanges 243 of the member 220 to substantially prevent any movement except vertical movement of the traveling member 240 and the plates 241.

A pulley 245 is mounted on the shaft 242 for rotation therewith. The pulley 245 has link engaging lugs around the outer periphery thereof for engagement with the chain 211. The end of the chain 211 extending through the hollow shaft 222 passes vertically down the center of the member 220, under the pulley 245 and horizontally outwardly therefrom to the automobile frame to be straightened. The pulley 245 rotates freely as the chain 211 is pulled by the motor 205 in cooperation with the worm reducer unit 206 and the pulley 210. When the chain 211 is connected to an automotive frame the pulley 245 has a horizontal force thereon which is also on the plates 241. However, the plates 241 butt against the flanges 243 under the horizontal force and, therefore, none of this force is applied to the shaft 236.

Thus, the entire member 220 along with the pulley 245 is rotatably mounted about its longitudinal axis so that the chain 211 always leaves the pulley 245 in a straight line. Also, the angle which the chain 211 makes with the horizontal plane containing the automobile frame to be straightened is easily varied by energizing the motor 237 to rotate the shaft 236 in the proper direction to raise or lower the pulley 245.

Thus, either embodiment of the present invention has the advantage of being able to apply a straightening force to a vehicle frame from any desired angle or from a variety of angles simultaneosuly, since more than one subframe 68 or 68' can be mounted on the O-shaped members 20 and 21. In addition, the subframes 68 or 68' can be quickly and easily moved to any desired position on the O-shaped members 20 and 21, whereby the power source is quickly and easily moved to the bent portion of the frame, or the horizontal angle which the chain 116 or 211 makes with the frame 121 may be varied easily. Also, the pulley 120 or 245 is quickly and easily moved vertically to change the angle which the chain 116 or 211 makes with the horizontal. In addition to the foregoing advantages the present invention has the additional advantage of being simply constructed and therefore relatively inexpensive and easy to manufacture as well as quick and easy to operate.

While we have shown and described a specific embodiment of this invention, further modifications and improvements will occur to those skilled in the art. We desire it to be understood, therefore, that this invention is not limited to the particular form shown and we intend in

We claim:
1. A vehicle frame straightening device comprising:
   (a) upper and lower guide acting frame members each being in the form of a continuous uninterrupted portion of track having corresponding sides joined by curved portions to an end;
   (b) means rigidly mounting said frame members in parallel, vertically spaced apart, generally horizontal positions;
   (c) a vertically elongated subframe mounted in engagement with said frame members for horizontal, longitudinal movement thereon, said subframe having a portion thereof mounted for rotation about a vertical axis;
   (d) power means mounted on said subframe for imparting a straightening force to said vehicle frame; and
   (e) flexible connecting means for connecting said power means to said vehicle frame in cooperation with said rotatable portion of said subframe to direct the straightening force in any desired direction.

2. The structure defined in claim 1 in further combination with means attached to said subframe and operating on said frame members to maintain said subframe in a desired position with respect to said frame members.

3. The structure defined in claim 1 in further combination with pulley means rotatably mounted on said pivotally attached portion of said subframe and vertically movable for receiving said flexible connecting means thereover and directing the force from said power means in the desired direction.

4. The structure defined in claim 1 in which said power means includes: a rotary electric motor adapted to be connected to an appropriate source of power through control apparatus and a plurality of pulleys for applying force to a flexible connecting means.

5. A vehicle frame straightening device comprising:
   (a) upper and lower substantially O-shaped guide acting frame members;
   (b) means rigidly mounting said frame members in parallel, vertically spaced apart, generally horizontal positions;
   (c) a vertically elongated subframe mounted in engagement with said frame members for horizontal, longitudinal movement thereon, said subframe having a portion thereof mounted for rotation about a vertical axis;
   (d) power means mounted on said subframe for imparting a straightening force to said vehicle frame;
   (e) flexible connecting means for connecting said power means to said vehicle frame at the desired position;
   (f) means for receiving said vehicle thereon positioned approximately centrally within the O of said frame members; and
   (g) means fixedly positioned, horizontally, relative to said guide acting frame members including adjustable means for engaging said vehicle frame at positions dynamically opposite the portion of the vehicle frame to be straightened and maintaining the engaged portions of said vehicle frame immovable during the straightening process.

6. The structure defined in claim 5 in which the adjustable means includes: a pair of horizontally extended, spaced apart members fixedly positioned horizontally relative to said guide acting frame members, a body member mounted between said pair of members for slidable engagement therewith and having an opening therethrough; a vertically extended member mounted for vertical movement within said opening; a first and second rack mounted on one of said pairs of members and said vertically extended member respectively; and first and second locking pawls operatively mounted on said body member for engagement with said first and second racks respectively, whereby said vertically extended member can be locked in abutment against a vehicle frame to substantially prevent movement thereof in a desired direction.

7. The structure defined in claim 1 in further combination with pulley means rotatably mounted on said pivotally attached portion of said subframe and vertically movable for receiving said flexible connecting means thereover and directing the force from said power means in the desired direction and power means for vertically moving said pulley means to a desired position.

8. The structure defined in claim 1 wherein the pivotal portion of the subframe extends substantially from the upper to the lower guide acting member.

9. The structure defined in claim 1 wherein the upper and lower guide acting frame members include I beams positioned so the web thereof is substantially horizontal.

10. The structure defined in claim 1 in further combination with means fixedly positioned, horizontally, relative to said guide acting frame members including adjustable means for engaging said vehicle frame at positions dynamically opposite the portion of the vehicle frame to be straightened and maintaining the engaged portions of said vehicle frame immovable during the straightening process.

References Cited

UNITED STATES PATENTS

| | | | |
|---|---|---|---|
| 2,013,785 | 9/1935 | Merrill | 72—705 X |
| 2,559,250 | 7/1951 | Jackson | 72—705 |
| 2,563,527 | 8/1951 | Gingrich et al. | 72—705 X |
| 2,692,002 | 10/1954 | Merrill et al. | 72—705 X |
| 2,705,040 | 3/1955 | Howick | 72—705 X |
| 2,717,020 | 9/1955 | Dobias | 72—705 |
| 3,122,194 | 2/1964 | Bronson et al. | 72—705 |
| 3,214,959 | 11/1965 | Bowden | 72—705 X |
| 3,269,169 | 8/1966 | Latuff et al. | 72—705 X |

FOREIGN PATENTS 1,011,759 12/1965 Great Britain.

CHARLES W. LANHAM, *Primary Examiner.*

RICHARD J. HERBST, *Examiner.*

E. SUTTON, *Assistant Examiner.*